US011265146B2

(12) United States Patent
Han et al.

(10) Patent No.: US 11,265,146 B2
(45) Date of Patent: Mar. 1, 2022

(54) ELECTRONIC APPARATUS MANAGING DATA BASED ON BLOCK CHAIN AND METHOD FOR MANAGING DATA

(71) Applicant: Samsung Electronics Co., Ltd., Suwon-si (KR)

(72) Inventors: Sangbok Han, Suwon-si (KR); Hyuncheol Park, Suwon-si (KR); Sangmin Kim, Suwon-si (KR); Seonjae Kim, Suwon-si (KR); Donghyun Lee, Suwon-si (KR); Changhoon Lee, Suwon-si (KR); Isak Choi, Suwon-si (KR); Kyungwan Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 16/398,949

(22) Filed: Apr. 30, 2019

(65) Prior Publication Data
US 2020/0220712 A1 Jul. 9, 2020

(30) Foreign Application Priority Data
Jan. 4, 2019 (KR) .......................... 10-2019-0001211

(51) Int. Cl.
*H04L 9/06* (2006.01)
*H04L 29/06* (2006.01)

(52) U.S. Cl.
CPC .......... *H04L 9/0637* (2013.01); *H04L 9/0643* (2013.01); *H04L 63/0428* (2013.01); *H04L 2209/38* (2013.01)

(58) Field of Classification Search
CPC . H04L 9/0637; H04L 63/0428; H04L 9/0643; H04L 2209/38; H04L 63/12; H04L 9/0861; H04L 9/0894; H04L 9/3239
See application file for complete search history.

(56) References Cited

U.S. PATENT DOCUMENTS 10,025,759 B2 * 7/2018 Mulder .................. G06F 16/93
10,114,970 B2 10/2018 Goldfarb et al.
(Continued)

FOREIGN PATENT DOCUMENTS

JP 2018109994 A 7/2018
JP 2018-136626 A 8/2018
(Continued)

OTHER PUBLICATIONS

Jaroslav Kacina; "Op Ed: Facebook Is Moving Into Blockchain: How Might This Play Out?"; posted on May 18, 2018 [https://bitcoinmagazine.com/articles/op-ed-facebook-moving-blockchain-how-might-play-out/].
(Continued)

*Primary Examiner* — Abiy Getachew
(74) *Attorney, Agent, or Firm* — Jefferson IP Law, LLP

(57) ABSTRACT

An electronic apparatus for managing data based on a block chain and a method therefor are provided. The electronic apparatus includes a communication interface, a memory, and a processor to receive a request for accessing data from an authenticated user, generate first block information regarding the request by including information on the request and at least one second block information related to the request from among a plurality of second block information stored in the memory, transmit the generated first block information to at least one of a plurality of external apparatuses constituting a block chain, and update the plurality of second block information stored in the memory based on the generated first block information. The plurality of second block information includes information on a block regarding a latest access history by category among a plurality of blocks included in block chain data shared by the plurality of external apparatuses.

17 Claims, 9 Drawing Sheets

(56) References Cited

U.S. PATENT DOCUMENTS

| | | | |
|---|---|---|---|
| 10,380,366 | B2 | 8/2019 | Bernau et al. |
| 2008/0310624 | A1* | 12/2008 | Celikkan ............... H04L 9/0637 380/29 |
| 2017/0244721 | A1 | 8/2017 | Kurian et al. |
| 2017/0302450 | A1 | 10/2017 | Ebrahimi |
| 2017/0352027 | A1 | 12/2017 | Zhang et al. |
| 2017/0364699 | A1 | 12/2017 | Goldfarb et al. |
| 2018/0083786 | A1* | 3/2018 | Dierks ............... G06Q 20/3678 |
| 2018/0139056 | A1* | 5/2018 | Imai ...................... H04L 9/3236 |
| 2018/0167394 | A1 | 6/2018 | High et al. |
| 2018/0191502 | A1* | 7/2018 | Karame ................ G06Q 20/02 |

FOREIGN PATENT DOCUMENTS

| | | |
|---|---|---|
| KR | 10-1829730 B1 | 3/2018 |
| KR | 10-2018-0037851 A | 4/2018 |
| WO | 2018/045574 A1 | 3/2018 |
| WO | 2018/151279 A1 | 8/2018 |
| WO | 2018/187133 A1 | 10/2018 |

OTHER PUBLICATIONS

Olga Kharif and Mark Bergen; "Google Is Working on Its Own Blockchain-Related Technology" posted on Mar. 22, 2018 [https://www.bloomberg.com/news/articles/2018-03-21/google-is-said-to-work-on-its-own-blockchain-related-technology].

Andries Van Humbeeck; "The Blockchain-GDPR Paradox" posted on Nov. 21, 2017 [https://medium.com/wearetheledger/the-blockchain-gdpr-paradox-fc51e663d047].

Extended European Search Report dated Sep. 20, 2021, issued in European Patent Application No. 19907558.1.

\* cited by examiner

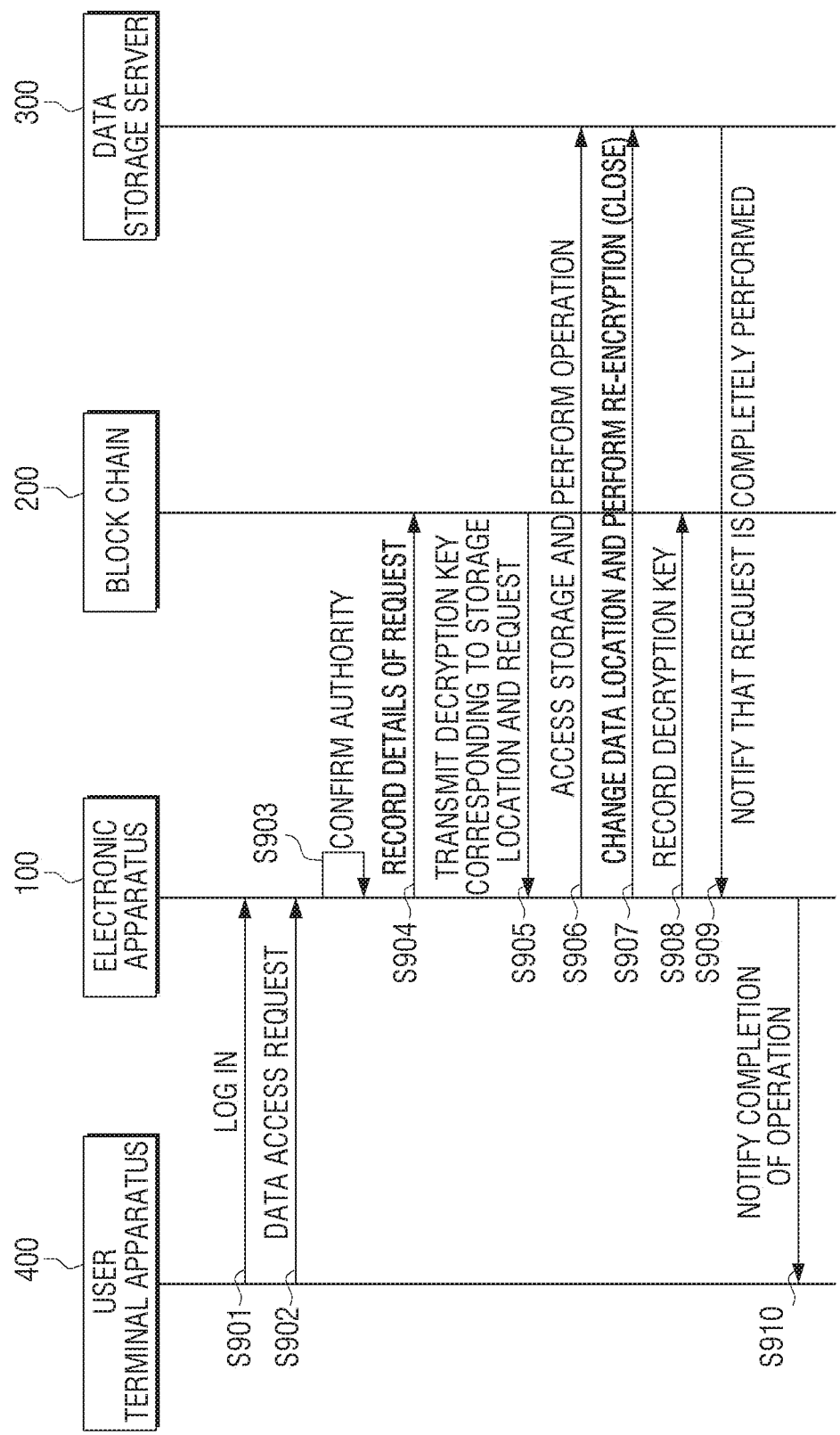

ELECTRONIC APPARATUS MANAGING DATA BASED ON BLOCK CHAIN AND METHOD FOR MANAGING DATA

CROSS-REFERENCE TO RELATED APPLICATION(S)

This application is based on and claims priority under 35 U.S.C. § 119 of a Korean patent application number 10-2019-0001211, filed on Jan. 4, 2019 in the Korean Intellectual Property Office, the disclosure of which is incorporated by reference herein in its entirety.

BACKGROUND

1. Field

The disclosure relates to an electronic apparatus managing data based on a block chain and a data management method. More particularly, the disclosure relates to an electronic apparatus managing data based on a block chain which manages a data access history transparently and a data management method.

2. Description of Related Art

Existing file sharing system costs a lot because the entire data is stored in a central server and thus, a high-performance security apparatus is required in order to prevent forgery and falsification of the stored files. In such method, information leakage can be caused merely by the hacking of the central server because all the files are stored in the central server. Thus, the security is inevitably weak.

In addition, when building a file sharing system run by each business, the target of attack from an outside is concentrated on the central server and thus, there is a problem that the operation costs required for the security occurs.

Meanwhile, as the emergence of a block chain technique in which security information is distributed and stored in a plurality of nodes, and jointly managed, the block chain has been used in various fields. When such a block chain is utilized, even if one node is hacked, this can be grasped through the information shared to other nodes, and thus, the forgery and falsification of information is practically impossible.

Accordingly, there is a growing demand for composing a file sharing system that guarantees integrity using a block chain that cannot be falsified, and sharing a file in a manner that the security is improved through the distributed person to person (P2P) system without a central server.

Meanwhile, there are problems that in the case of storing all the data in the block chain, the data cannot be modified because data integrity is provided based on consensus, and it is unsuitable for storing vast amounts of data because the same data is stored in various nodes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus managing data based on a block chain for transparently managing the data access history using a block chain and searching for the access history stored in the block chain more easily, and a data management method.

Additional aspects will be set forth in part in the description which follows and, in part, will be apparent from the description, or may be learned by practice of the presented embodiments.

In accordance with an aspect of the disclosure, an electronic apparatus for managing data based on a block chain is provided. The electronic apparatus includes a communication interface comprising communication circuitry, a memory, and at least one processor configured to receive a request for accessing data from an authenticated user, generate first block information regarding the request by including information on the request and at least one second block information related to the request from among a plurality of second block information stored in the memory, transmit the generated first block information to at least one of a plurality of external apparatuses constituting a block chain, and update the plurality of second block information stored in the memory based on the generated first block information, wherein the plurality of second block information stored in the memory may be information on a block regarding a latest access history by category among a plurality of blocks included in block chain data shared by the plurality of external apparatuses.

The at least one processor is further configured to include block information regarding a latest access history of at least one category in the first block information, the block information regarding a latest access history of at least one category included in information regarding the request from among the plurality of second block information.

The category may include at least one of a user, a data file format, a subject which creates data or a specific keyword.

The block information regarding the latest access history by category may include at least one of a block number storing the latest access history by category or a block number storing a decryption key regarding the latest access history by category.

The first block information may include first hash value related to end block information pre-stored in the block chain data, and second hash value related to block information regarding the latest access history by category related to the request in the second block information stored in the memory.

The at least one processor is configured to transmit a decryption key received from one of the plurality of external apparatuses to a data storage server after transmitting the generated block information, receive decrypted data based on the decryption key from the data storage server, and transmit the decrypted data to a user terminal apparatus.

The at least one processor is further configured to, after receiving a decryption key from one of the plurality of external apparatuses, generate a new encryption key and a new decryption key corresponding to the encryption key, transmit the new encryption key to the data storage server for encrypting the decrypted data using the new encryption key and storing the encrypted data in the data storage server, and transmit the new decryption key to at least one of the plurality of external apparatuses which share the block chain data.

The transmitted first block information is, based on at least one preset external apparatus among the plurality of external apparatuses approving sharing of the generated first block information, shared as block chain data to the plurality of external apparatuses.

In accordance with another aspect of the disclosure, a method for managing data based on a block chain is provided. The method includes receiving a request for accessing data from an authenticated user, generating first block information regarding the request by including information on the request and at least one second block information related to the request from among a plurality of second block information stored in the memory, transmitting the generated first block information to at least one of a plurality of external apparatuses constituting a block chain, updating the plurality of second block information stored in the memory based on the generated first block information, wherein the plurality of second block information stored in the memory may be information on a block regarding a latest access history by category among a plurality of blocks included in block chain data shared by the plurality of external apparatuses.

The generating of the first block information may include including block information regarding a latest access history of at least one category in the first block information, the block information regarding a latest access history of at least one category included in information regarding the request from among the plurality of second block information, in the first block information.

The category may include at least one of a user, a data file format, a subject which creates data or a specific keyword.

The block information regarding the latest access history by category may include at least one of a block number storing the latest access history by category or a block number storing a decryption key regarding the latest access history by category.

The first block information may include a first hash value related to end block information pre-stored in the block chain data, and a second hash value related to block information regarding the latest access history by category related to the request in the second block information stored in the memory.

The method further includes transmitting a decryption key received from one of the plurality of external apparatuses to a data storage server after transmitting the generated block information, receiving decrypted data based on the decryption key from the data storage server, and transmitting the decrypted data to a user terminal apparatus.

The method further includes after receiving a decryption key from one of the plurality of external apparatuses, generating a new encryption key and a new decryption key corresponding to the encryption key, transmitting the new encryption key to the data storage server for encrypting the decrypted data using the new encryption key and storing the encrypted data in the data storage server, and transmitting the new decryption key to at least one of the plurality of external apparatuses which share the block chain data.

The transmitted block information, based on at least one preset external apparatus among the plurality of external apparatuses approving sharing of the generated block information, may be shared as block chain data to the plurality of external apparatuses.

In accordance with another aspect of the disclosure, there is provided a non-transitory computer readable recording medium having recorded thereon at least one program comprising commands, which when executed by a computer, performs a method. The method includes, based on a request for accessing data being input by an authenticated user, generating first block information regarding the request by including information on the request, and at least one second block information related to the request from among a plurality of second block information stored in the memory, and transmitting the generated first block information to at least one of a plurality of external apparatuses constituting a block chain, updating the plurality of second block information stored in the memory based on the generated first block information, wherein the plurality of second block information stored in the memory are information on a block regarding a latest access history by category among a plurality of blocks included in block chain data shared by the plurality of external apparatuses.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a sequence view for illustrating a data management method according to an embodiment of the disclosure.

Throughout the drawings, it should be noted that like reference numbers are used to depict the same or similar elements, features, and structures.

DETAILED DESCRIPTION

Figure 1:
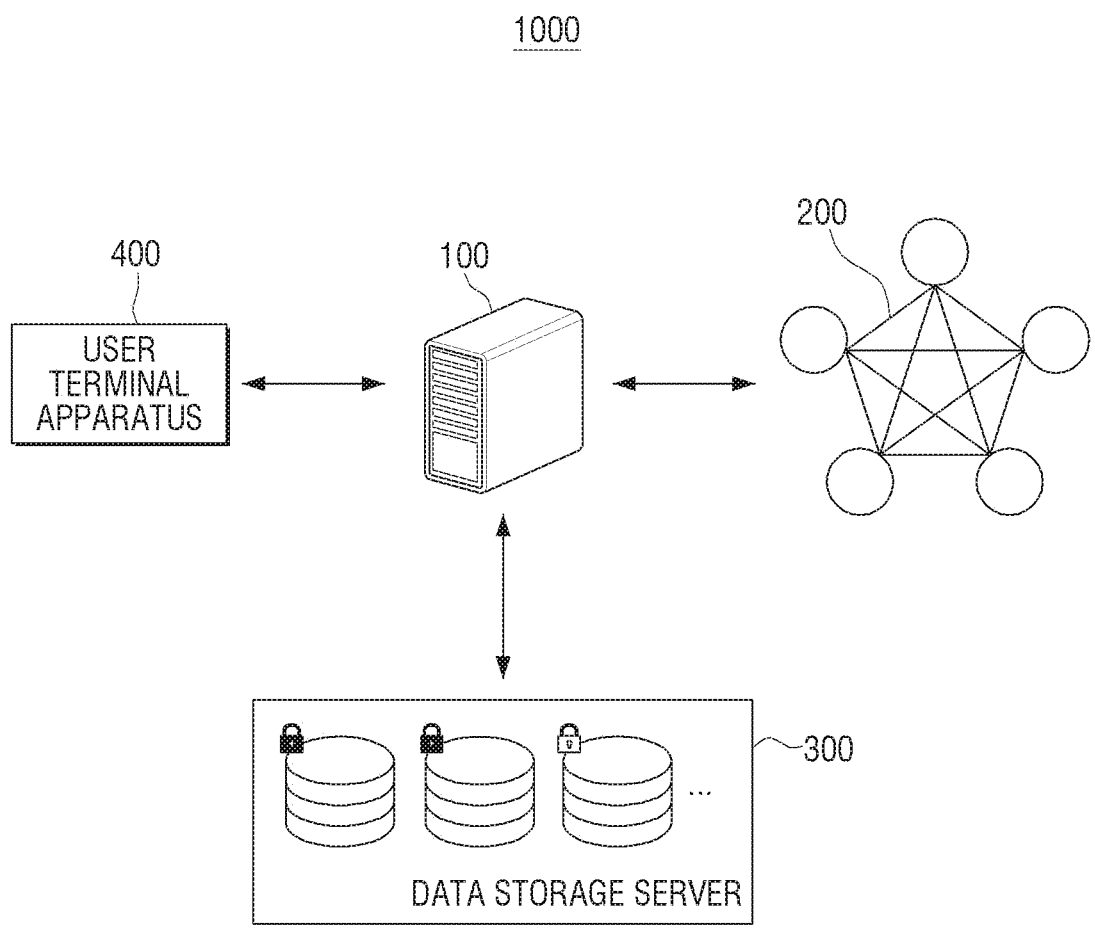
FIG. 1 is a view illustrating a data management system based on a block chain according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The embodiments may vary, and may be provided in different embodiments. Various embodiments will be described with reference to accompanying drawings. However, it is to be understood that the disclosure is not limited to a specific embodiment, but includes all modifications, equivalents, and substitutions without departing from the scope and spirit of the disclosure. While describing embodiments, if it is determined that the specific description regarding a known technology obscures the gist of the disclosure, the specific description is omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The embodiments of the disclosure will be described in greater detail below in a manner that will be understood by one of ordinary skill in the art. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

Hereinafter embodiments will be described in detail with reference to accompanying drawings.

FIG. 1 is a view illustrating a data management system based on a block chain according to an embodiment of the disclosure.

Referring to FIG. 1, the data management system 1000 based on a block chain includes an electronic apparatus 100, a block chain 200, a data storage server 300, and a user terminal apparatus 400.

The electronic apparatus 100 may be a server for managing data. Specifically, the electronic apparatus 100 may be a server that communicate with an external apparatus such as the block chain 200, the data storage server 300, and the user terminal apparatus 400, and that manages data stored in the data storage server 300. For example, the electronic apparatus 100 may be the apparatus in which an application operates in a person to person (P2P) format based on a block chain.

The electronic apparatus 100 may receive data access request from the user terminal apparatus 400. The user terminal apparatus 400 may be the apparatus including an interface (a display, a button, a touch screen, etc.) which may provide information to a user and receive the operation command from the user. For example, the user terminal apparatus 400 may be various apparatuses such as a television (TV), a mobile phone, a smart phone, a personal digital assistant (PDA), a notebook personal computer (PC), a desktop, a tablet PC, an electronic book, an electronic frame, a kiosk, a refrigerator, a washing machine, a smart speaker, a smart watch, an air conditioner, an audio, a digital video disc (DVD) displayer, an air cleaner, a boiler, etc.

For another embodiment, the electronic apparatus 100 and the user terminal apparatus 400 may be one apparatus. In this case, the electronic apparatus 100 may directly receive the data access request of a user.

The block chain 200 is a distributed data storage technology that transparently records a transaction history in a book that anyone can read and copies and stores the transaction history in a plurality of computers. The plurality of computers may verify the records and prevent hacking. In the embodiment, a data access history can be recorded in the block chain 200 in addition to the transaction history.

In the embodiment, the electronic apparatus 100 may be included in the plurality of apparatuses constituting the block chain 200 or not. In both cases, the electronic apparatus 100 may transmit the generated block information to at least one of a plurality of external apparatuses that constitute the block chain 200.

The block chain 200 is in a form that blocks are connected one after another as a chain. The block chain 200 may send the access history to all users participating in the data sharing and whenever there is an access request, all participants share and compare information so as not to forge or falsify the data.

The block chain 200 in the disclosure may have a multiple connection structure in which the information on the latest access history by category is added when generating a block and an additional connection structure is included in a successive chain structure. The structure of the block chain 200 in the disclosure will be described with reference to FIG. 5 below.

The data storage server 300 may store the information received from the electronic apparatus 100. Specifically, the data storage server 300 may receive information input by a user through the user terminal apparatus 400 from the electronic apparatus 100 and store the information.

In addition, the data storage server 300 may receive an encryption key from the electronic apparatus 100 and decrypt the encrypted data or encrypt the decrypted data. Specifically, the data storage server 300 may decrypt the data stored by being encrypted using the existing decryption key, and encrypt the decrypted data using the newly generated encryption key and store the encrypted data in another location.

As described above, in the disclosure, the security of data can be improved by managing the data access history using the block chain 200. In addition, the block chain 200 in the disclosure has a multiple connection structure, and thus, searching for the data access history may be easily performed.

Figure 2:
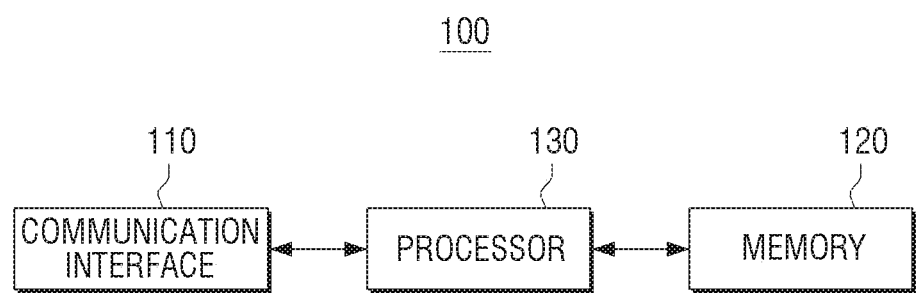
FIG. 2 is a block diagram illustrating a brief configuration of an electronic apparatus according to an embodiment of the disclosure.

FIG. 2 is a block diagram illustrating a brief configuration of an electronic apparatus according to an embodiment of the disclosure.

Referring to FIG. 2, the electronic apparatus 100 includes a communication interface 110, a memory 120, and a processor 130.

The communication interface 110 including communication circuitry is an element that communicates with various types of external apparatuses in various types of communication methods. Here, the external apparatus that communicates with the electronic apparatus 100 may be a user terminal apparatus, at least one of a plurality of external apparatuses constituting a block chain, a data storage server, etc.

The communication connection of the communication interface 110 may include the communication through a third apparatus (e.g., relay, hub, access point, server, gateway, etc.). The wireless communication, for example, may include a cellular communication using at least one among long-term evolution (LTE), LTE Advance (LTE-A), code division multiple access (CDMA), wideband CDMA (WCDMA), universal mobile telecommunications system (UMTS), wireless broadband (WiBro) or global system for mobile communications (GSMC). According to an embodiment, wireless communication may include at least one of, for example, wireless fidelity (WiFi), Bluetooth, Bluetooth low energy (BLE), Zigbee, near field communication (NFC), Magnetic Secure Transmission, radio frequency (RF) or body area network (BAN). Wired communication may include at least one of, for example, universal serial bus (USB), high definition multimedia interface (HDMI), recommended standard 232 (RS-232), power line communication or plain old telephone service (POTS). The network in which the wireless communication or the wired communication is performed may include at least one of a telecommunication network, for example, a computer network (e.g., local area network (LAN) or wide-area network (WAN)), internet or telephone network.

In the above, it has been illustrated that the communication interface 110 is one configuration, but in the implementation, the communication interface 110 may include more than one communication module.

The memory 120 may store various programs and data required for the operation of the electronic apparatus 100. To be specific, the memory 120 may include at least one command. The processor 130 may perform the above described operation by executing the command stored in the memory 120. The memory 120 may be implemented as a non-volatile memory, a volatile memory, a flash memory, a hard disk drive (HDD) or a solid state drive (SDD).

Specifically, the memory 120 stores various modules for managing data. For example, the memory 120 may store the module for managing the access history, the module for managing an authority, the module for managing an encryption, the module for managing a storage, and the like. With regard to each module for managing data will be described in detail with reference to FIGS. 3 and 4.

Specifically, the memory 120 may store the block information regarding the latest access history by category, the category is a type of information included in the block. Here, the memory 120 may store a plurality of block information and the plurality of block information stored in the memory 120 may be the block information regarding the latest access history by category. Here, the block information stored in the memory 120 may include at least one of a block number in which the latest access history by category is stored or the block number in which the decryption key regarding the latest access history by category is stored.

Here, the category may be at least one of a user, a data file format, a subject which creates data or a specific keyword. The category means a sort of information included in the block and may be referred to as an item and the like.

Here, the user may be a user account which requested to access data. In addition, the data file format may be a requested data file format and distinguished by an extension, etc., and may be distinguished by various file formats such as a document (doc, hwp, xls, etc.), an image (jpg, jpeg, tif, png, etc.), a moving image (mp4, mov, avi, etc.), pdf file, etc. In addition, the subject which creates data is information on the subject which generates or provides data stored in the data storage server, and may be a user account or business information. In addition, the specific keyword refers to a specific keyword included in the data and when using the block information regarding the latest access history by keyword, the data access history that the data including a specific keyword is requested may be searched for.

For example, if one category is 'user', the memory 120 may store the information on a block that stores the history of the latest data access request by user. For example, the memory 120 may store the information on the block storing the history of the last data access request of user A, information on the block storing the history of the last data access request of user B, and the like. Here, the latest block information regarding user A and the latest block information regarding user B may be the information regarding different blocks.

If another category is in 'data file format', the memory 120 may store the information on the block storing the last request history of a document file, the information on the block storing the last request history of an image file, and the like. According to an embodiment, the last request history by extension of file may be stored in the memory 120.

As in the above, the memory 120 may store the information on a block storing the latest access history for each of various categories. This will be described in detail below with reference to FIGS. 3 and 4.

The processor 130 controls an overall operation of the electronic apparatus 100.

According to an embodiment, the processor 130 may be implemented as a digital signal processor (DSP), a microprocessor, and a time controller (TCON). However, it is not limited thereto and may include one or more than one of a central processing unit (CPU), a micro controller unit (MCU), a micro processing unit (MPU), a controller, an application processor (AP), a communication processor (CP), or an asynchronous response mode (ARM) processor, or defined as the corresponding term. In addition, the processor 130 may be implemented as a system on chip (SoC) or a large-scale integration (LSI) in which a processing algorithm is embedded, or implemented in a form of a field programmable gate array (FPGA).

In the embodiment, if the processor 130 of the electronic apparatus 100 receives a request for accessing data from a user, may generate the block information regarding the corresponding request by including the information on the request. Here, the request for accessing the data may be received from the user terminal apparatus through the communication interface 110. In another embodiment, if the electronic apparatus 100 is the same configuration as a user terminal apparatus, the request for accessing data may be received through the operation command input to the electronic apparatus 100 by a user.

If the data access request is input, the processor 130 may generate the block information regarding the request by including the information on the input request. Here, the generated block information regarding the request includes the data access history, and the block information may include the information on a user who requests to access data, request time information, information on requested data, etc.

Here, the block information may include the information on the latest block which is the last block of the block chain data stored in a plurality of external apparatuses constituting the block chain. According thereto, when modifying the block chain data which is already stored, all of the block information stored in the block chain data should be modified, and thus, the modification is difficult and the integrity is secured.

Further, the processor 130 may generate the block information regarding the request by further including the block information on the latest access history by category which is distinguished from the latest block of the block chain data.

Specifically, the processor 130 may generate the block information on the request by further including at least one block information related to the input request of the user from among the plurality of block information stored in the memory 120. Here, the processor 130 may generate the block information on the request by further including the block information regarding the latest access history of at least one category included in the input request of the user from among the plurality of block information stored in the memory 120.

For example, if the number of the block last saved in the block chain data is #204 and if the number of the block storing the last data request history of user A is #201, the number of the block generated according to the data access request of user A is #205. Here, the processor 130 may further include the information on block #201 in addition to the information on block #204 for generating block #205. Thus, it may become easy to search for the data access request history of user A in the block chain data. Such a multiple connection structure of the bock chain will be described in detail with reference to FIG. 4 below.

In addition, the processor 130 may obtain hash value regarding at least one block information related to the input user request between the information on the input user's request and a plurality of block information stored in the memory 120, using hash function. In addition, the processor 130 may generate the block information regarding the input user request using the obtained hash value. The hash function is the function that outputs hash value in a fixed length by inputting the message having an arbitrary length, and may provide the integrity which can detect an error or falsification of the message by outputting evidence value which cannot be changed regarding the input message. When signing an electronic autograph regarding a long message, the autograph is signed regarding short hash value, not directly on the entire message, and thus, the operation quantity may be reduced.

In addition, the processor 130 may update at least one of a plurality lock information stored in the memory 120 based on the block information regarding the generated request of the user. Specifically, the processor 130 may update the block information used for generating the block information regarding the request of the user among the plurality of block information stored in the memory 120 to the generated block information. For example, if the block number regarding the latest access history of user A stored in the memory 120 is #201 and the block number generated according to the data access request of user A is #205, the processor 130 may further include the information on block #201 in addition to the information on block #204 when generating block #205, and the information on block #201 which is regarding the latest access history of user A stored in the memory 120 may updated to the information on block #205.

In addition, the processor 130 may transmit the block information regarding the request of the user generated through the communication interface 110 to at least one of a plurality of external apparatuses constituting the block chain.

In addition, if the processor 130 transmits the generated block information to at least one of the plurality of external apparatuses, may receive the decryption key from one of the plurality of external apparatuses through the communication interface 110. Here, the received decryption key may be the decryption key which is pre-stored in the block chain data and last stored in the block chain data.

In addition, if the processor 130 receives a decryption key from one of the plurality of external apparatuses, the processor 130 may generate a new encryption key and the decryption key corresponding to the new encryption key. In addition, the processor 130 may transmit the newly generated encryption key to the data storage server. The data storage server may encrypt and store the decrypted data using the generated encryption key. In addition, the processor 130 may transmit the newly generated decryption key to at least one of the plurality of external apparatuses constituting the block chain. The transmitted decryption key may be stored as block chain data.

The data processing process using the encryption key and the decryption key described above will be described in detail with reference to FIGS. 7 and 8 below.

As in the above, as the new encryption key and decryption key are generated whenever a user requests for accessing data, there is an effect that the security is improved.

In addition, the processor 130 may transmit the received decryption key to the data storage server. In addition, the processor 130 may receive the decrypted data based on the decryption key transmitted from the data storage server through the communication interface 110.

In addition, the processor 130 may transmit the decrypted data to the user terminal apparatus. In another embodiment, if the electronic apparatus 100 is the same apparatus with the user terminal apparatus, the processor 130 may control and display the provided display 140 which is illustrated in FIG. 3.

As described above, by generating block information by further including the block information regarding the latest access history by category, the block chain data become a multiple connection structure and according thereto, it may become easy to search for the access history stored as the block chain data.

Figure 3:
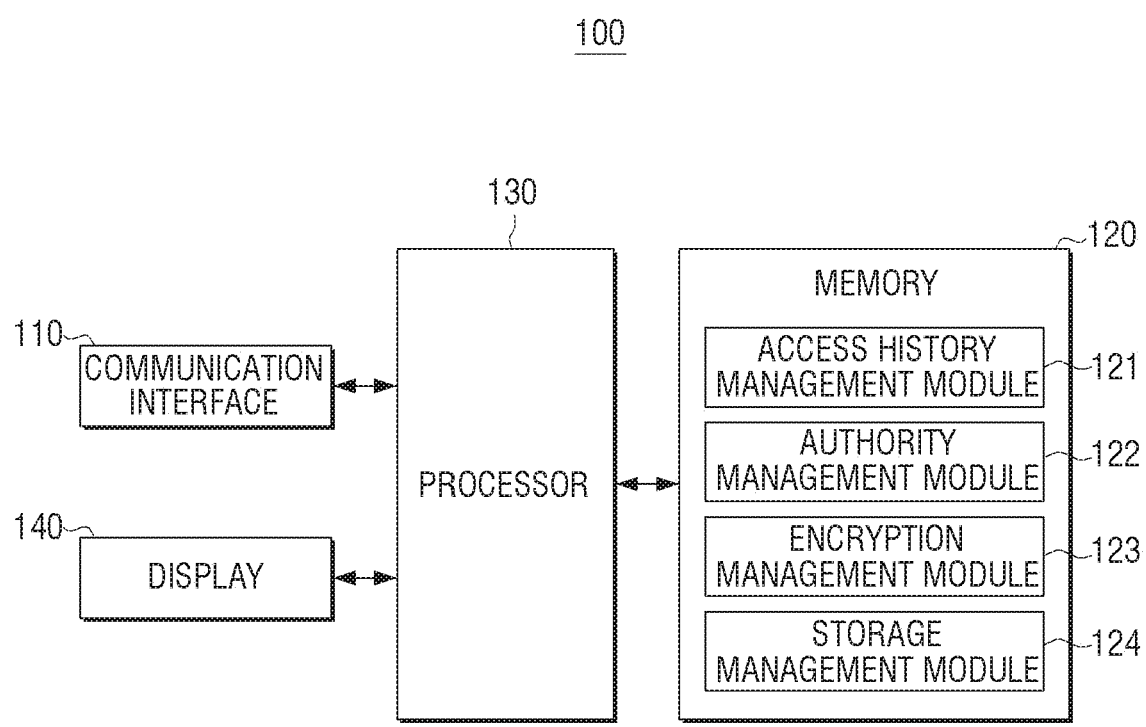
FIG. 3 is a block diagram illustrating a detailed configuration of an electronic apparatus illustrated in FIG. 2.

FIG. 3 is a block diagram for illustrating a detailed configuration of the electronic apparatus illustrated in FIG. 2 according to an embodiment of the disclosure.

Referring to FIG. 3, the electronic apparatus 100 may include the communication interface 110, the memory 120, the processor 130 and the display 140.

Here, some configurations of the communication interface 110, the memory 120, and the processor 130 are the same as those illustrated in FIG. 2, and thus, the overlapping description will be omitted.

The memory 120 may store a plurality of modules and the processor 130 may drive the electronic apparatus 100 using the data stored in the stored module. For example, the memory 120 may store at least one of an access history management module 121, an authority management module 122, an encryption management module 123 or a storage management module 124.

The access history management module 121 may store and manage the plurality of block information. Specifically, the access history management module 121 may store and manage the information on the block regarding the latest access history by category.

The block information store in the access history management module 121 may include at least one of the block number in which the latest access history by category is stored and the block number in which the decryption key regarding the latest access history by category is stored. Here, the category may be at least one of a user, a data file format, a subject which creates data or a specific keyword.

Figure 4:
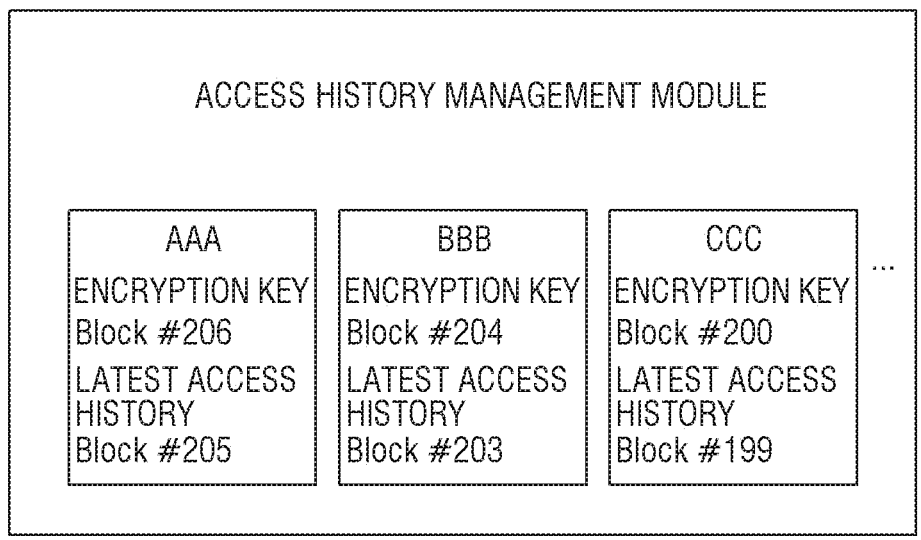
FIG. 4 is a view illustrating a latest access history by category stored in an electronic apparatus according to an embodiment of the disclosure.
Figure 4:
Figure 4:
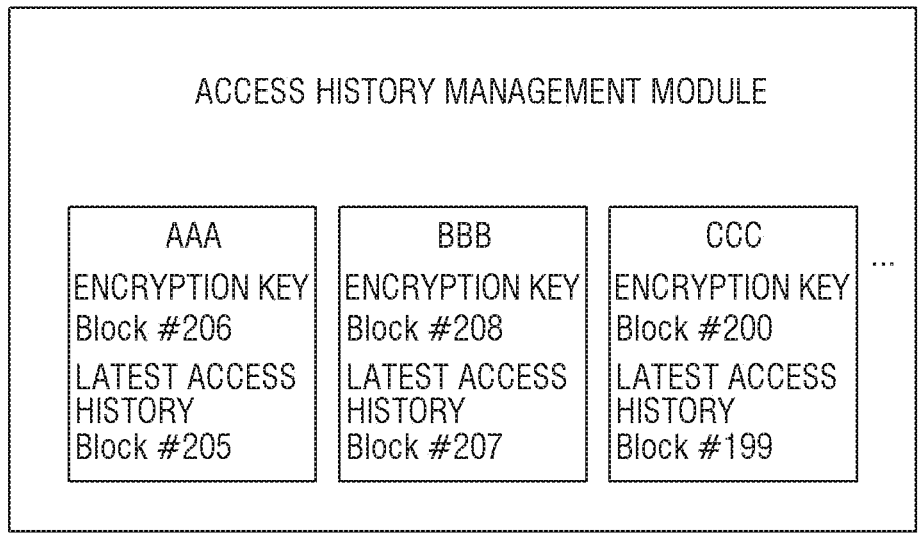

FIG. 4 is a view illustrating a latest access history by category stored in an electronic apparatus according to an embodiment of the disclosure.

For example, as illustrated in FIG. 4, the access history management module 121 may store the block information regarding the latest access history by user.

Referring to FIG. 4, the access history management module 121 may store the block information regarding the latest access history of user AAA, user BBB, and user CCC. Here, only the information on the authenticated user may be stored in the access history management module 121. Here, the authenticated user may mean the user who succeeds in logging in by inputting a user account and a password from among the plurality of users who stored the user account and the password corresponding thereto in advance.

Specifically, the access history management module 121 may store that the block number storing the information on the latest access history of user AAA is #205 and the block number storing the information on the encryption key regarding block #205 is #206. In addition, the access history management module 121 may store #203 which is the information on the latest access history of user BBB and #204 which is the information on the encryption key thereof, and #199 which is the information on the latest access history of user CCC and #200 which is the information on the encryption key thereof, respectively. Here, the encryption key may be a symmetric key or an asymmetric key.

Here, if the data access request of user BBB is received, the processor 130 may generate block information by further including the information on the latest access history of user BBB stored in the access history management module 121. For example, if the block number newly generated according to the data access history of user BBB is #207, the processor 130 may generate block #207 by including the information on block #206 which is last stored in the block chain data and the information on blocks #204 and #205 which store the information on the latest access history of user BBB. Here, the processor 130 may generate block #207 by including the information on the corresponding data access request of user BBB in addition to the pre-stored information (e.g., information on #204, #205 and #206).

In addition, the processor 130 may transmit the generated information on block #207 to at least one of a plurality of external apparatuses constituting the block chain and store the transmitted information as block chain data. Here, when the decryption key stored in #206 is received from one of the plurality of external apparatuses, the processor 130 may generate the new encryption key and decryption key and store the newly generated decryption key as block chain data by transmitting the newly generated decryption key to at least one of the plurality of external apparatuses. Here, the number of block storing the newly generated decryption key may be #208.

In addition, the processor 130 may update the information stored in the access history management module 121 using the generated block information. For example, referring to FIG. 4, the processor 130 may update #203 which is the information on the latest access history of user BBB to #207, and update #204 which is the information on the encryption key to #208.

Meanwhile, in FIG. 4, it has been illustrated that only the information on the latest access history regarding the user among a plurality of categories is stored in the access history management module 121, but the information on the latest access history by data file format, subject which creates data, and specific keyword may be stored according to an embodiment.

Figure 5:
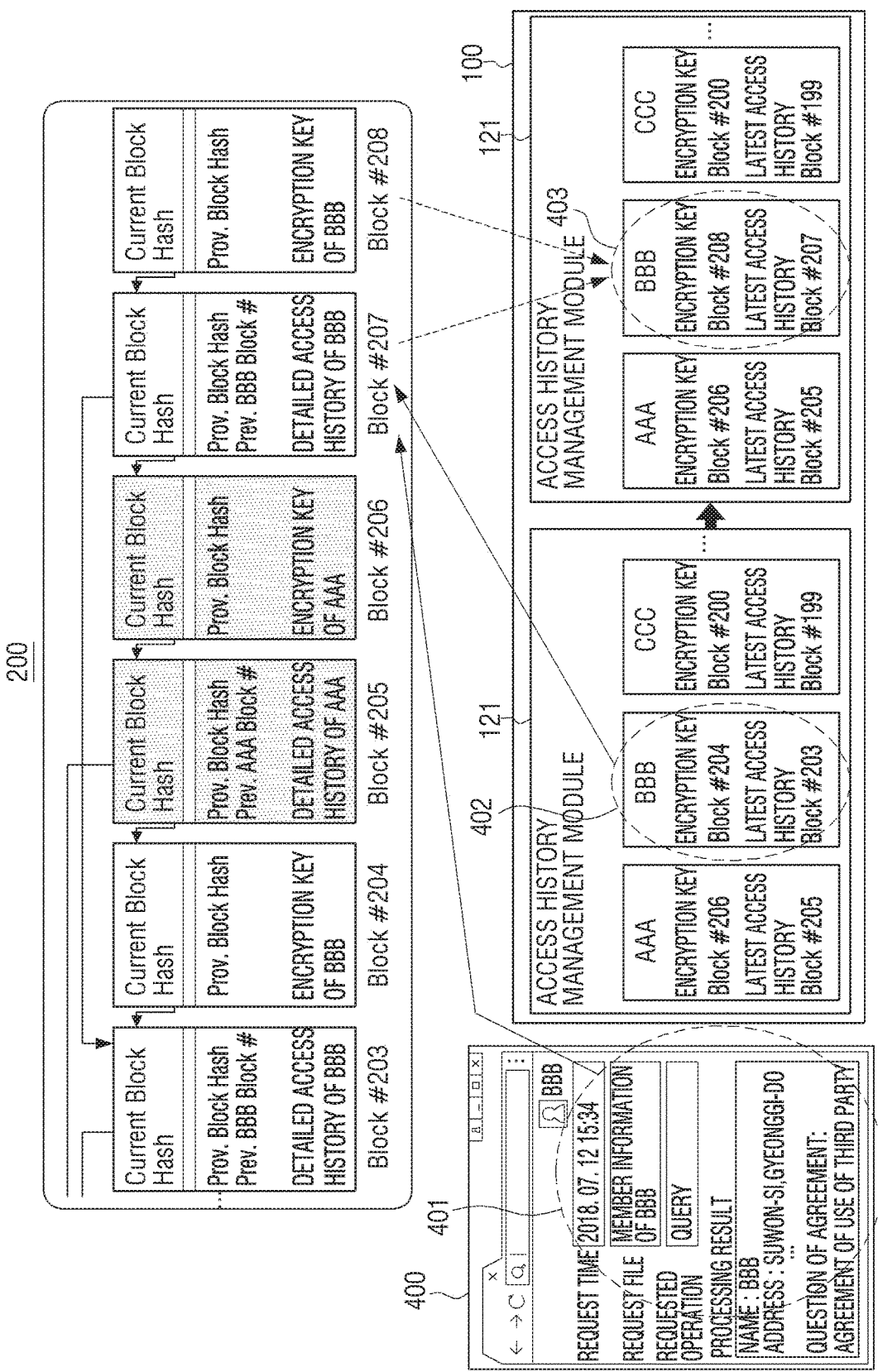
FIG. 5 is a view illustrating a method for generating a block using a latest access history by category stored in an electronic apparatus according to an embodiment of the disclosure.

As in the above, as new block information is generated by further adding information on the latest access history by category stored in the access history management module 121, the plurality of blocks included in the block chain data in the disclosure may be generated in a multiple connection structure as illustrated in FIG. 5.

Meanwhile, the authority management module 122 may store the information for identifying whether a user has an authority to access data. Specifically, the authority management module 122 may store the user account for logging in and a password corresponding thereto. In addition, the authority management module 122 may store the information on the data which has an access authority by user account, according to the smart contract. Here, the smart contract is a program for recording the terms of a contract in the block chain and executing the contract automatically when the terms are met. Based on the smart contract, the data access history through the authorized user terminal apparatus 400 during the set period is stored in the block chain 200, and the data corresponding to the request may be provided.

The encryption management module 123 may store the data for generating an encryption key. Here, the encryption key may be a symmetric key or an asymmetric key. The encryption management module 123 may generate a new encryption key and a decryption key corresponding thereto by the control of the processor 130.

The encryption management module 123 may store hash function. The hash function is the function that outputs hash value in a fixed length by inputting the message having an arbitrary length, and may provide integrity which can detect an error or falsification of the message by outputting evidence value which cannot be changed regarding the input message. When signing an electronic autograph regarding a long message, the autograph is signed regarding short hash value, not directly on the entire message, and thus, the operation quantity may be reduced.

The storage management module 124 may store the information on the location of data stored in the data storage server. In addition, if the data storage server stores the decrypted data in another location using a new encryption key, the information of the storage management module 124 may be updated by the control of the processor 130.

FIG. 5 is a view illustrating a method for generating a block using the latest access history by category stored in an electronic apparatus according to an embodiment of the disclosure.

Referring to FIG. 5, first, if a user inputs the information 401 for data access request through the user terminal apparatus 400, the electronic apparatus 100 may receive the information 401 on the request from the user terminal apparatus 400. In addition, the electronic apparatus 100 may generate the block information on the request using the information 401 regarding the received request and the block information 402 regarding the latest access history by category pre-stored in the access history management module 121. Here, the block information 402 regarding the pre-stored latest access history by category may include the number of the block regarding the latest access history.

In addition, the electronic apparatus 100 may transmit the generated block information to at least one of the plurality of external apparatuses constituting the block chain 200.

Here, the external apparatus that receives the block information from the electronic apparatus 100 may store the received block information as an end block of the block chain data stored in the block chain 200. Here, the block including the information on the new encryption key may also be stored.

Meanwhile, when generating the block information regarding the request using the block information 402 regarding the latest access history by category pre-stored in the access history management module 121, the electronic apparatus 100 may update the block information 402 regarding the pre-stored latest access history by category to the block information 403 regarding the latest access history by category to which the block information regarding the request is reflected.

For example, if user BBB inputs the data access request, the electronic apparatus 100 may generate the block information regarding the data access request using the block information 402 regarding the latest access history of user BBB pre-stored in the access history management module 121. In FIG. 5, the pre-stored block information 402 regarding the latest access history of user BBB may include block number #203 which is regarding the last data access history of user BBB and the electronic apparatus 100 may generate the block information regarding the data access request of user BBB by reflecting the information on block number #203 and transmit the generated block information to at least one of a plurality of external apparatuses which share the block chain 200. The transmitted block information may be stored as block #207 which is the end of the block chain data stored in the block chain 200. In addition, according to the data access request of user BBB, the electronic apparatus 100 may provide data to user BBB using the encryption key of block #206, generate a new encryption key and store the generated encryption key in block #208.

In addition, the electronic apparatus 100 may update the block information 402 regarding the pre-stored latest access history of user BBB to the block information 403 regarding the latest access history of user BBB to which generated block information is reflected. For example, the electronic apparatus 100 may update the block information 402 regarding the pre-stored latest access history of user BBB into the block information 403 regarding the latest access history of user BBB by reflecting the information on block #207 generated regarding the data request of user BBB. Here, the electronic apparatus 100 may update the block information 402 to the block information 403 regarding the latest access history of user BBB by further reflecting the information on block #208 regarding the encryption key. Meanwhile, the block chain data stored in the block chain 200 may have a multiple connection structure. Specifically, a plurality of blocks included in the block chain data may include the information on the previous blocks, respectively. For example, block of which number is # n may include information on the block of which number is # n−1.

In addition, the plurality of blocks included in the block chain data of the disclosure may further include the information on the block other than the previous blocks in addition to the information on the previous blocks. Here, the additionally included block information may be the information on at least one of the blocks which have been stored before the previous blocks.

Specifically, the additionally included block information may be the information on the block regarding the latest access history by category. Here, the category may be at least one of a user, a data file format, a subject which creates data or a specific keyword.

Here, the additionally included block information may relate to the information on the access request of the corresponding block. Specifically, the additionally included block information may be information on the latest block including the same information with at least one of user information, a data file format, a subject which creates data or a specific keyword, included in the access request of the corresponding block. For example, block #207 of FIG. 5 may include information on block #206 which is the previous block, and the information on block #203 in which the previous data access history of user BBB who is the user of the data access history stored in block #207 is stored. According thereto, only the block which stores the access history of user BBB may be searched without searching all blocks in the block chain data.

Meanwhile, the information on the previous block included in the plurality of block information of the block chain data and the block information on the latest access history by category may be in a form of hash value.

Specifically, the plurality of block information of the block chain data may include the hash value related to the information on a previous block (current block hash) and the hash value related to the block information regarding the latest access history by category (prov. Block hash). Here, in a case in which block information is newly generated according to the data access request of a user, the generated block information may include the information on the end block pre-stored in the block chain data as the first hash value (current block hash), and include the block information regarding the latest access history by category related to the request as the second hash value (prov. Block hash).

Specifically, the first hash value (current block hash) may be obtained by hashing the block header of the current block including the hash value of a previous block. Here, the block header of the current block including the hash value of the previous block may further include payload hash value, block generation time, and Number used Once (Nonce).

Meanwhile, the second hash value (prov. Block hash) may be the hash value obtained by hashing the block header of the current block including the hash value of the latest block in the same category before generating the current block.

Meanwhile, for convenience of description, in FIG. 5, it has been described that the information on the latest access history regarding 'user' is further included in the corresponding block, but in the implementation, the information on the latest access history by two or more categories among a plurality of categories may be further included.

As in the above, if the information on the latest access history by two or more than two categories is further included, the block chain 200 may be in a form of multiple structure.

Figure 6:
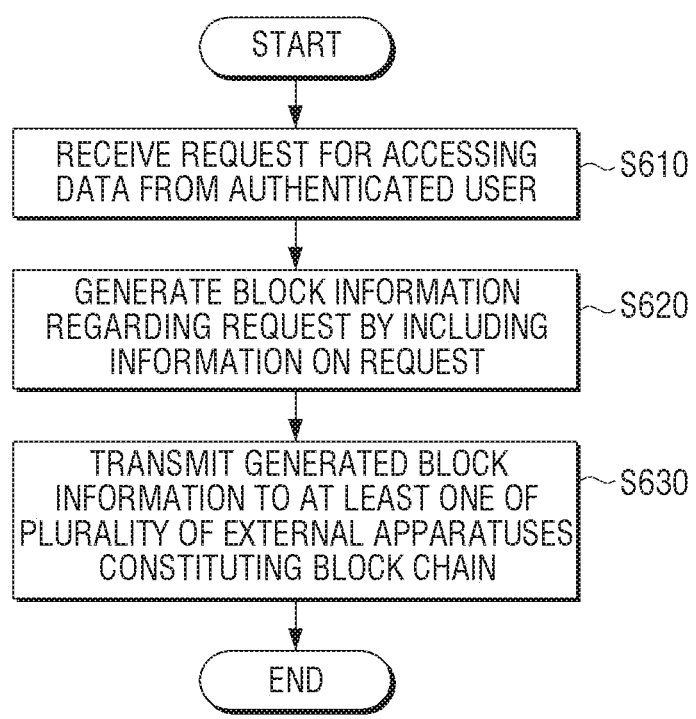
FIG. 6 is a flow chart illustrating a data management method of an electronic apparatus according to an embodiment of the disclosure.

FIG. 6 is a flow chart illustrating a data management method of an electronic apparatus according to an embodiment of the disclosure.

Referring to FIG. 6, first, the electronic apparatus may receive the request for accessing data from the authenticated user in operation S610. Here, the electronic apparatus may receive the data access request from the user terminal apparatus. Alternatively, if the electronic apparatus is a user terminal apparatus, the electronic apparatus may directly receive the data access request from a user. Here, the authenticated user may mean the user who succeeds in logging in by inputting a user account and a password from among the plurality of users who stored the user account and the password corresponding thereto in advance.

In addition, the electronic apparatus may generate the block information regarding the request by including the information on the request in operation S620. Specifically, the electronic apparatus may generate the block information regarding the request by including the latest block information of the block chain data and the block information regarding the latest access history by category distinguished from the latest block of the block chain data. Here, the added block information may be a part of the block information stored in the electronic apparatus. Specifically, the added block information may be the block information regarding the latest access history by at least one category included in the input request of a user from among the plurality of block information stored in the electronic apparatus.

In addition, the block information regarding the latest access history by the added category may be information on at least one block. Specifically, the added block information may be information on the latest block including the same information with at least one of the information by category included in the request of the user. Here, the electronic apparatus may obtain the hash value regarding the information on the user request and the hash value regarding the block information on the latest access history by added category using the hash function. In addition, the block information regarding the user's request may be generated using the obtained hash value.

In addition, the generated block information may be transmitted to at least one of the plurality of external apparatuses constituting the block chain in operation S630. The electronic apparatus may transmit the generated block information to at least one of the plurality of external apparatuses constituting the block chain so that the generated block information is stored as the block chain data. In addition, the electronic apparatus may receive the decryption key for decrypting data from at least one external apparatus from among the plurality of external apparatuses constituting the block chain. The electronic apparatus may receive the data stored in the data storage server using the received decryption key.

Meanwhile, although not illustrated in FIG. 6, when block information regarding the data access request of a user is generated, the electronic apparatus may update the block information regarding the latest access history pre-stored in the electronic apparatus using the generated block information.

Figure 7:
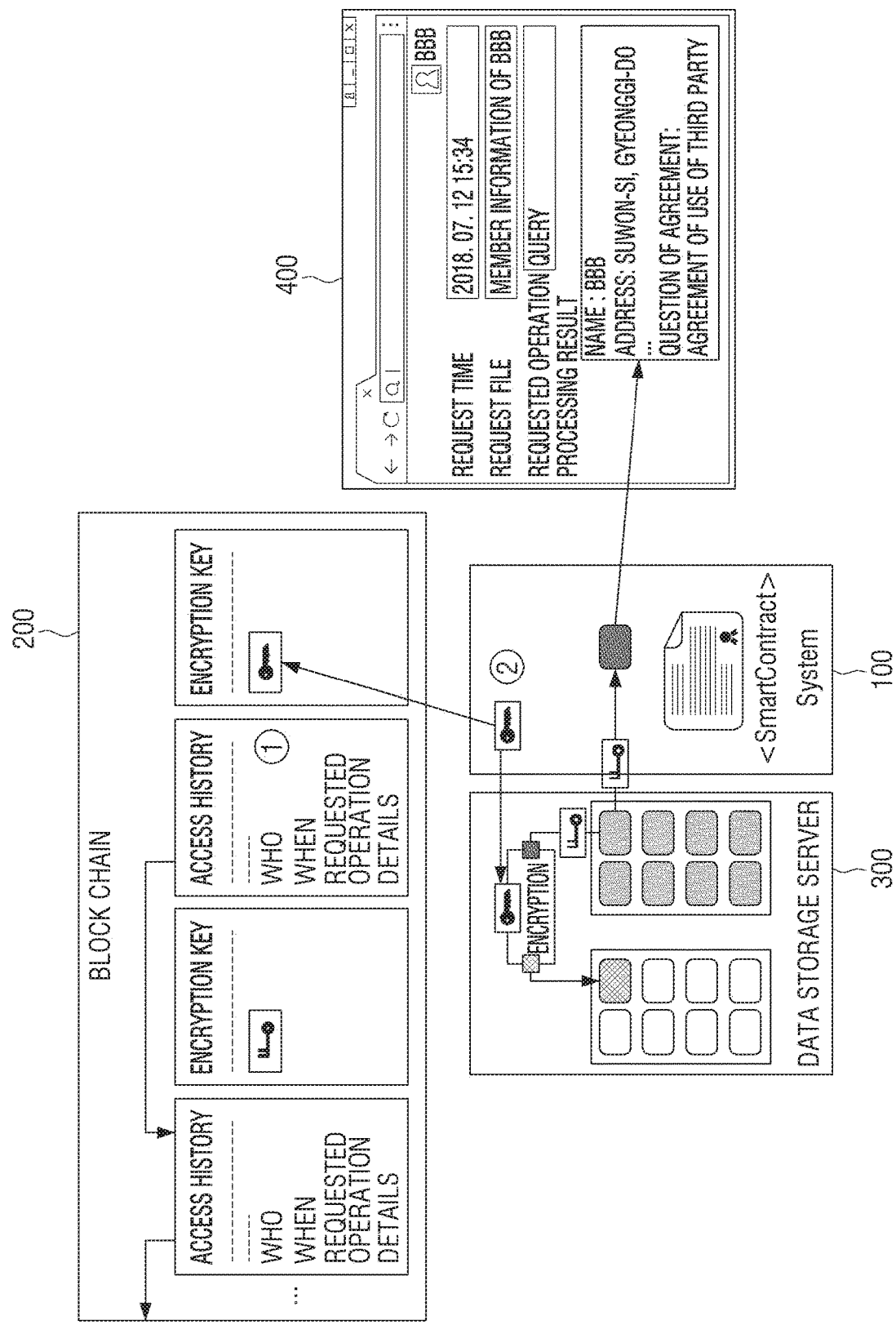
FIG. 7 is a view illustrating a process for reading data pre-stored in a data storage server according to an embodiment of the disclosure.

FIG. 7 is a view illustrating a process for reading data pre-stored in a data storage server according to an embodiment of the disclosure.

Referring to FIG. 7, user BBB may input a data access request through the user terminal apparatus 400. In an embodiment, user BBB may input the request for querying of stored data.

If the data access request is received from the user terminal apparatus 400, the electronic apparatus 100 may generate the block information regarding the request and transmit the generated block information to at least one external apparatus constituting the block chain 200 so as to store the history ① regarding the access request of user BBB.

In addition, the electronic apparatus 100 may receive the encryption key stored in the previous block information of the block information regarding the user access request. Here, the received encryption key may be a decryption key, and may be a symmetric key or an asymmetric key. In addition, the electronic apparatus 100 may transmit the decryption key of the received block to the data storage server 300. In addition, the electronic apparatus 100 may receive the data decrypted using the decryption key from the data storage server 300. Here, the data storage server 300 may encrypt the decrypted data using the new encryption key ② and store the encrypted key in a new location. In addition, the electronic apparatus 100 may transmit a new decryption key to at least one external apparatus constituting the block chain 200 so that the decryption key corresponding to the new encryption key is included in the block chain data.

In addition, the electronic apparatus 100 may transmit the decrypted data received from the data storage server 300 to the user terminal apparatus 400 and provide the decrypted data to the user. Here, if the electronic apparatus 100 and the user terminal apparatus 400 are the same apparatus, the electronic apparatus 100 may provide the decrypted data in a form that the decrypted data is displayed on the display included in the electronic apparatus 100. As in the above, whenever a user requests the data access, the new encryption key and new decryption key are generated and thus, the security is improved.

Figure 8:
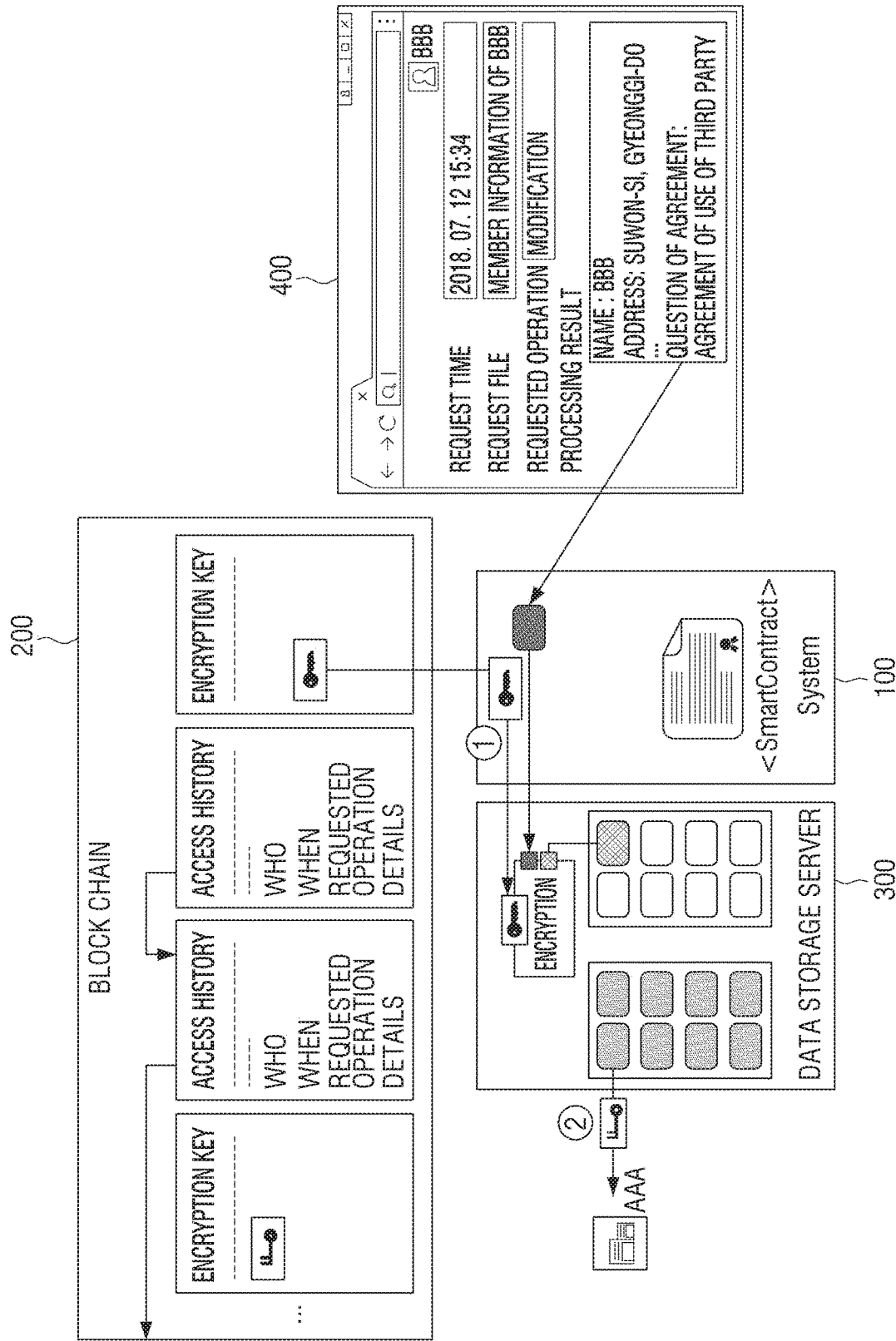
FIG. 8 is a view illustrating a process for writing new data in a data storage server according to an embodiment of the disclosure.

FIG. 8 is a view illustrating a process for writing new data in a data storage server according to an embodiment of the disclosure.

Referring to FIG. 8, the operation after the state that according to the data modification request ① of user BBB is input from user terminal apparatus 400, the electronic apparatus 100 may generate and transmit the block information about the request so that the data access history ① is stored in the block chain 200, and the data decrypted through the operation of FIG. 7 to a user.

Referring to FIG. 8, if a user modifies the displayed data, the electronic apparatus 100 may receive the modified data from the user terminal apparatus 400. In addition, the electronic apparatus 100 may generate the new encryption key for storing the modified data. The electronic apparatus 100 may transmit the generated new encryption key and the modified data to the data storage server 300. The data storage server 300 may store the received data in a new location using the received new encryption key.

Here, if the data access request ② of user AAA is received while the modified data is not completely stored, the electronic apparatus 100 may generate and transmit the block information about the request so that the data access history ② is stored in the block chain 200, and receive the existing encryption key from the block chain 200. In addition, the electronic apparatus 100 may transmit the received existing encryption key to the data storage server 300 so that the data storage server 300 decrypts the existing data using the received existing encryption key and provides the decrypted data to user AAA. Although not illustrated in FIG. 8, the electronic apparatus 100 may receive the decrypted data from the data storage server 300 and provide the decrypted data to user AAA.

In addition, if the data modified by the data modification request ① is completely stored in the data storage server 300, the electronic apparatus 100 may transmit a new encryption key so that a new encryption key is stored in the block chain 200 and after then, the existing encryption key cannot be used.

FIG. 9 is a sequence view for illustrating a data management method according to an embodiment of the disclosure.

Referring to FIG. 9, first, the electronic apparatus 100 may receive a log in request in operation S901 and a data access request in operation S902 from the user terminal apparatus 400. In addition, the electronic apparatus 100 may identify the user account with the received log in information and confirm whether the requested data has an access authority in operation S903.

In addition, the electronic apparatus 100 may record the details of the user data access request in the block chain 200 in operation S904. Specifically, the electronic apparatus 100 may generate the block information on the user's data access request and transmit the generated block information to at least one of a plurality of external apparatuses constituting the block chain 200. Here, the generated block information may include the information on the last stored block in the block chain data and the information on the block storing the latest access history by category which is distinguished from the information on the last stored block. According thereto, the block chain 200 may have a multiple connection structure.

After recording the request history, the electronic apparatus 100 may receive the location of a storage which is the information included in the last block stored in the block chain 200 and the decryption key corresponding to the request in operation S905. Here, the decryption key may be at least one of a symmetry key or an asymmetry key.

In addition, the electronic apparatus 100 may access the data storage server 300 and perform a request operation in operation S906. Specifically, the electronic apparatus 100 may transmit the received decryption key to the data storage server 300 and request to transmit the requested data. Then, the electronic apparatus 100 may generate and transmit a new encryption key so that the data storage server 300 changes the location of data and perform re-encryption in operation S907. The data storage server 300 may encrypt again the decrypted data using the received new encryption key and store the encrypted data in another location in operation S908.

In addition, the electronic apparatus 100 may store the generated new encryption key in the block chain 200. Here, the encryption key stored in the block chain 200 may be a decryption key.

If the data decryption is completed, the data storage server 300 may transmit the decrypted data to the electronic apparatus 100 and transmit the completion notification in operation S909. In addition, the electronic apparatus 100 may transmit the received decryption data to the user terminal apparatus 400 to provide the decryption data to a user and notify that the requested operation is completed in S910.

Meanwhile, in FIG. 9, it has been described that the electronic apparatus 100, the block chain 200 and the data storage server 300 are separated apparatuses, but these apparatuses may be implemented as at least one apparatus which can perform operations of the electronic apparatus 100, the block chain 200 and the data storage server 300. According to the various embodiments described above, as the block information is generated by further adding the block information regarding the latest access history by category, the block chain data become a multiple connection structure and according thereto, it may become easy to search for the access history stored as the block chain data. In addition, as the new encryption key and new decryption key are generated whenever a user requests for accessing data, there is an effect that the security is improved.

Various embodiments described above may be implemented in a recording medium that may be read by a computer or a similar apparatus to the computer by using software, hardware, or a combination thereof. According to the hardware embodiment, embodiments that are described in the disclosure may be implemented by using at least one selected from application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions. In some cases, embodiments that are described in the disclosure may be embodied as the processor itself. In a software embodiment, various embodiments described in the disclosure such as a procedure and a function may be implemented as separate software modules. The software modules may respectively perform one or more functions and operations described in the embodiments.

The methods according to various embodiments describe above may be stored on a non-transitory readable medium. The non-transitory readable medium may be installed and used in various devices.

The non-transitory computer readable medium is not a medium that stores data for a short moment such as a register, a cash and a memory and the like, but a medium that stores data semi-permanently and which is readable by an apparatus. Specifically, programs of performing the above-described various methods can be stored in a non-transitory computer readable medium such as a compact disc (CD), a DVD, a hard disk, a Blu-ray disk, universal serial bus (USB), a memory card, ROM, or the like, and can be provided.

According to an embodiment, the method according to the above-described various embodiments may be provided as being included in a computer program product. The computer program product may be traded as a product between a seller and a consumer. The computer program product may be distributed online in the form of machine-readable storage media (e.g., compact disc ROM (CD-ROM)) or through an application store (e.g., Play Store™ and App Store™). In the case of online distribution, at least a portion of the computer program product may be at least temporarily stored or temporarily generated in a server of the manufacturer, a server of the application store, or a storage medium such as memory of a relay server.

Although various embodiments of the disclosure have been illustrated and described hereinabove, the disclosure is not limited to the above-mentioned embodiments, but may be variously modified by those skilled in the art to which the disclosure pertains without departing from the scope and spirit of the disclosure as set forth in the accompanying claims. These modifications should also be understood to fall within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus for managing data based on a blockchain, the electronic apparatus comprising:
   a communication interface comprising communication circuitry;
   a memory; and
   at least one processor configured to:
   receive, from an authenticated user, a request for accessing data,
   in response to receiving the request, generate first block information regarding the request by including information on the request and at least one second block information related to the request from among a plurality of second block information stored in the memory, the plurality of second block information stored in the memory comprising information on a block regarding a latest access history by category among a plurality of blocks included in blockchain data shared by a plurality of external apparatuses,
   transmit the first block information to at least one of the plurality of external apparatuses constituting a blockchain, and
   update the plurality of second block information stored in the memory based on the first block information.

2. The electronic apparatus of claim 1, wherein the at least one processor is further configured to include block information regarding a latest access history of at least one category in the first block information, the block information regarding a latest access history of at least one category included in information regarding the request from among the plurality of second block information.

3. The electronic apparatus of claim 1, wherein the category includes at least one of a user, a data file format, a subject which creates data, or a specific keyword.

4. The electronic apparatus of claim 1, wherein the information on the block regarding the latest access history by category comprises at least one of a block number storing the latest access history by category or a block number storing a decryption key regarding the latest access history by category.

5. The electronic apparatus of claim 1, wherein the first block information comprises:
   a first hash value related to end block information pre-stored in the blockchain data; and
   a second hash value related to the information on the block regarding the latest access history by category related to the request in the plurality of second block information stored in the memory.

6. The electronic apparatus of claim 1, wherein the at least one processor is further configured to:
   after transmitting the first block information, transmit, to a data storage server, a decryption key received from one of the plurality of external apparatuses,
   receive, from the data storage server, decrypted data based on the decryption key, and
   transmit the decrypted data to a user terminal apparatus.

7. The electronic apparatus of claim 6, wherein the at least one processor is further configured to:
   after receiving a decryption key from one of the plurality of external apparatuses, generate a new encryption key and a new decryption key corresponding to the new encryption key,
   transmit the new encryption key to the data storage server for encrypting the decrypted data using the new encryption key and storing the encrypted data in the data storage server, and
   transmit the new decryption key to at least one of the plurality of external apparatuses which share the blockchain data.

8. The electronic apparatus of claim 1, wherein, based on at least one preset external apparatus among the plurality of external apparatuses approving a sharing of the first block information, the first block information is shared as blockchain data to the plurality of external apparatuses.

9. A method for managing data based on a blockchain, the method comprising:
   receiving a request for accessing data from an authenticated user;
   in response to receiving the request, generating first block information regarding the request by including information on the request and at least one second block information related to the request from among a plurality of second block information stored in a memory, the plurality of second block information stored in the memory comprising information on a block regarding a latest access history by category among a plurality of blocks included in blockchain data shared by a plurality of external apparatuses;
   transmitting the first block information to at least one of the plurality of external apparatuses constituting a blockchain; and
   updating the plurality of second block information stored in the memory based on the first block information.

10. The method of claim 9, wherein the generating of the first block information comprises including block information regarding a latest access history of at least one category in the first block information, the block information regarding a latest access history of at least one category included in information regarding the request from among the plurality of second block information.

11. The method of claim 9, wherein the category includes at least one of a user, a data file format, a subject which creates data or a specific keyword.

12. The method of claim 9, wherein the information on the block regarding the latest access history by category includes at least one of a block number storing the latest access history by category or a block number storing a decryption key regarding the latest access history by category.

13. The method of claim 9, wherein the first block information includes:
   a first hash value related to end block information pre-stored in the blockchain data; and
   a second hash value related to block information regarding the latest access history by category related to the request in the second block information stored in the memory.

14. The method of claim 9, further comprising:
   after transmitting the first block information, transmitting, to a data storage server, a decryption key received from one of the plurality of external apparatuses;
   receiving, from the data storage server, decrypted data based on the decryption key; and transmitting the decrypted data to a user terminal apparatus.

15. The method of claim 14, further comprising:

after receiving a decryption key from one of the plurality of external apparatuses, generating a new encryption key and a new decryption key corresponding to the new encryption key;

transmitting the new encryption key to the data storage server for encrypting the decrypted data using the new encryption key and storing the encrypted data in the data storage server; and transmitting the new decryption key to at least one of the plurality of external apparatuses which share the blockchain data.

16. The method of claim 10, wherein the transmitted first block information, based on at least one preset external apparatus among the plurality of external apparatuses approving sharing of the first block information, is shared as blockchain data to the plurality of external apparatuses.

17. A non-transitory computer readable recording medium having recorded thereon at least one program comprising commands, which when executed by a computer, performs a method, the method comprising:

based on a request for accessing data being input by an authenticated user, generating first block information regarding the request by including information on the request and at least one second block information related to the request from among a plurality of second block information stored in a memory, the plurality of second block information stored in the memory comprising information on a block regarding a latest access history by category among a plurality of blocks included in blockchain data shared by a plurality of external apparatuses;

transmitting the generated first block information to at least one of a plurality of external apparatuses constituting a blockchain; and updating the plurality of second block information stored in the memory based on the generated first block information.

* * * * *